United States Patent [19]
Defranco

[11] Patent Number: 4,909,331
[45] Date of Patent: Mar. 20, 1990

[54] HITCH GEAR HAVING A LOAD TRANSFER SYSTEM

[76] Inventor: Hubert Defranco, 6, rue du Moulin, 51140 Jonchery sur Vesles, France

[21] Appl. No.: 319,676

[22] Filed: Mar. 7, 1989

[30] Foreign Application Priority Data

Mar. 8, 1988 [FR] France .................................. 88 02929

[51] Int. Cl.⁴ ........................................... A01B 63/11
[52] U.S. Cl. ........................................ 172/4; 172/444; 172/2
[58] Field of Search .................... 172/2, 4, 7, 8, 9, 10, 172/239, 444

[56] References Cited

U.S. PATENT DOCUMENTS

| | | | |
|---|---|---|---|
| 2,755,721 | 7/1956 | Rusconi | 172/4 |
| 2,924,285 | 2/1960 | Shame et al. | 172/4 |
| 3,198,547 | 8/1965 | Annat | 172/4 |
| 3,517,943 | 6/1970 | Bunting et al. | 172/7 X |
| 4,044,838 | 8/1977 | Wooldridge | 172/2 |
| 4,508,178 | 4/1985 | Cowell et al. | 172/7 X |
| 4,529,039 | 7/1985 | Sakundiak | 172/4 |
| 4,535,847 | 8/1985 | Hasegawa et al. | 172/2 |

Primary Examiner—Randolph A. Reese
Assistant Examiner—Jeffrey L. Thompson
Attorney, Agent, or Firm—Cushman, Darby & Cushman

[57] ABSTRACT

The hitch gear comprises a three point lift system. It comprises a system (10) for load transfer by means of a hydraulic cylinder (11) at the third point and at least adjustment wheel (13) provided with a load sensor (19) suitable to act with control means of the cylinder (11) for keeping the load at the level of the adjustment wheel (13) approximately constant. The lift system comprises at least one hydraulic cylinder (27); a control device (28) of the position of the lift system, known per se, is provided and comprises at least an attachment means (29) for a reference position and appreciable control means at the fixed position suitable for supplying the hydraulic cylinder (27). A hydraulic distribution system (44) is provided between the cylinder at the third point (11) and the cylinder (27) and is connected in such a way that when the cylinder at the third point (11) acts in a direction which causes an increase in the load carried by the tractor, said distribution system (44) allows the creation of a raising of the level of the lifting device and, inversely, a lowering.

8 Claims, 2 Drawing Sheets

HITCH GEAR HAVING A LOAD TRANSFER SYSTEM

FIELD OF THE INVENTION

The invention relates to a hitch gear for an implement, in particular an agricultural implement, designed to be carried on a tractor, provided with a lifting system having three points, namely two lower, lateral points and one high median point.

BACKGROUND OF THE INVENTION

The hitch gear according to the invention is of a type comprising a load transfer system with at least one hydraulic cylinder, called "three point", of variable length, provided between the high median point of the lift system of the tractor and a locking point connected to the implement, and at least one adjustment wheel, provided to take up a part of the load generated by the implement, said adjustment wheel being provided with a sensor for the particular load and acting on the control means for the cylinder, according to the changes in the loads supported by the adjustment wheel, for the transfer of the initial load supported by the adjustment wheel(s) to the suspension of the tractor on the side where the implement is hitched, all the while maintaining in a fairly constant manner the residual charge at the level of the adjustment wheel.

Hitch gear of this type is known, particularly from French Patent Application 2 562 752 in the name of the instant applicant, filed on Apr. 17, 1984, and published on Oct. 18, 1985. This priority document relates in particular to a hitch gear for an implement of great width comprising two adjustment wheels, one wheel provided on each side of the implement; an interface is provided between the lifting system of the tractor and the locking means of the implement, and the load transfer system can affect two hydraulic cylinders of variable length provided between the high median point of the lifting system of the tractor and a lateral locking point of the interface connected with the implement. However, it is understood that the load transfer system may comprise one single hydraulic cylinder, such as is for example the case with narrow implements like plows.

The invention relates most particularly, but not exclusively, to a hitch gear designed to be mounted in front of the tractor and to be pushed.

It is known that the transfer or transmission of the load of the implement to the tractor assures good contact with the ground, at the same time improving the traction capacity of the tractor engine. This results in an appreciable improvement of the output and a decrease in the energy expended.

However, a problem in connection with this technique has arisen. When an increase of the load is transferred to the tractor, the latter is slightly lowered because of the compression of the suspension and the wheel elements, in particular the tires. This results in a change in the working height of the implement in the vicinity of its connection to the tractor.

SUMMARY OF THE INVENTION

It is in particular an object of the invention to provide a solution to this problem and to prevent that the part of the implement located near the tractor undergoes a change in the height of contact with the ground when variations of the load supported by the tractor occur on the basis of load transfer.

Furthermore, it is hoped that the solution of this problem would be simple to put into effect, at the same time providing increased efficiency while remaining economical.

In accordance with the invention a hitch gear for an implement designed to be carried on a tractor comprising a three-point lift system of the type previously defined is characterized in the the lift system comprises at least one hydraulic cylinder; in that a control device for the lift system, known per se, is provided, said control device comprising at least a display means for a reference position of the lift system and control means sensitive to the correct attachment position to maintain the hydraulic cylinder(s) of the lift system in such a way that the implement assumes a position corresponding to said attachment; and in that a distribution system of the hydraulic connection is provided between the cylinder at the third point and the cylinder of the lift system, said distribution system being connected in such a way that, when the cylinder at the third point acts in a way which brings about an increase in the load supported by the tractor, said hydraulic distribution system allows the creation of an elevation to the level of the lift device and, inversely, a lowering.

Thus the lowering of the tractor, in particular by reason of the compression of the tires by a load increase, is compensated, in regard to the level of the implement, by the raising introduced by the lift system, such that the part of the implement located adjacent to the tractor undergoes practically no change in the height of its contact with the ground at the time the load changes are transferred to the tractor. Because of the absence of a correlation between the horizontal and vertical stresses endured by the implement, there existed a prejudice against the establishment of such a hydraulic connection between a cylinder at the third point, the internal pressure of which is strongly influenced by the horizontal stresses, and a cylinder of the lift system, the internal pressure of which essentially depends on vertical stresses. Additionally, the differences in the displacemet and stroke of each type of cylinder (lifting, third point) may vary from one model to the other; accordingly it is difficult to calibrate the orifices precisely, taking into account the great variations in pressure and load loss due to the nature of the respective conduits and the variation in the viscosity of the hydraulic fluid. Therefore either a drift in the position of the lift system or of the implement could be expected.

In a surprising way, by adopting a control device for the position of the lift system and introducing a reference position provided by a display means such as a cam or other indexing of, for example, an analog type, all drift of the position of the lift system is avoided and a particularly satisfactory operation is achieved. A control device for the position of the lift system with display of one reference position is described in French Patent Application 2 568 087, filed on July 24, 1984, in the name of the instant applicant, and published on Jan. 31, 1986.

Preferably the distribution system of the hydraulic connection is provided with controllable throttle means, in particular with two throttles mounted in series, a nonreturn valve being inserted between the inlet and outlet of each throttle and the two valves being mounted in an inverse direction.

In the case where the load transfer is comprised of two hydraulic cylinders, the shafts of which form an angle, the distribution system of the hydraulic connection between the cylinder(s) of the lift system is divided into two parallel branches, each branch being connected to one cylinder at the third point, said branches rejoining to be reunited with the cylinder(s) of the lift system.

The control device for the position of the lift system advantageously comprises manual control means for raising and/or lowering the implement; according to the invention an electrical circuit is provided which is connected with a live connector to control the raising of the lift system, the electrical circuit comprising a switch and control means for shortening the cylinders at the third point, which always corresponds with a lifting action.

Preferably the switch of the above-mentioned electrical circuit is designed to remain in the position in which it was last put, i.e. closed or open, and the control means comprise at least a relay, the coils of which are plugged into the circuit, the contact(s) of this relay being suitable for controlling an activating coil of a hydraulic valve corresponding to the cylinder at the third point associated with the relay, this control being effected in a manner which causes the shortening of the said cylinder at the third point and the cancellation of the load transfer function.

The invention comprises, with the arrangements described above put in practice, a certain number of other arrangements, which will be described in much greater detail below by means of an exemplary embodiment and having reference to the attached drawings, but which is in no way limiting.

DETAILED DESCRIPTION OF A PREFERRED EMBODIMENT

Figure 1:
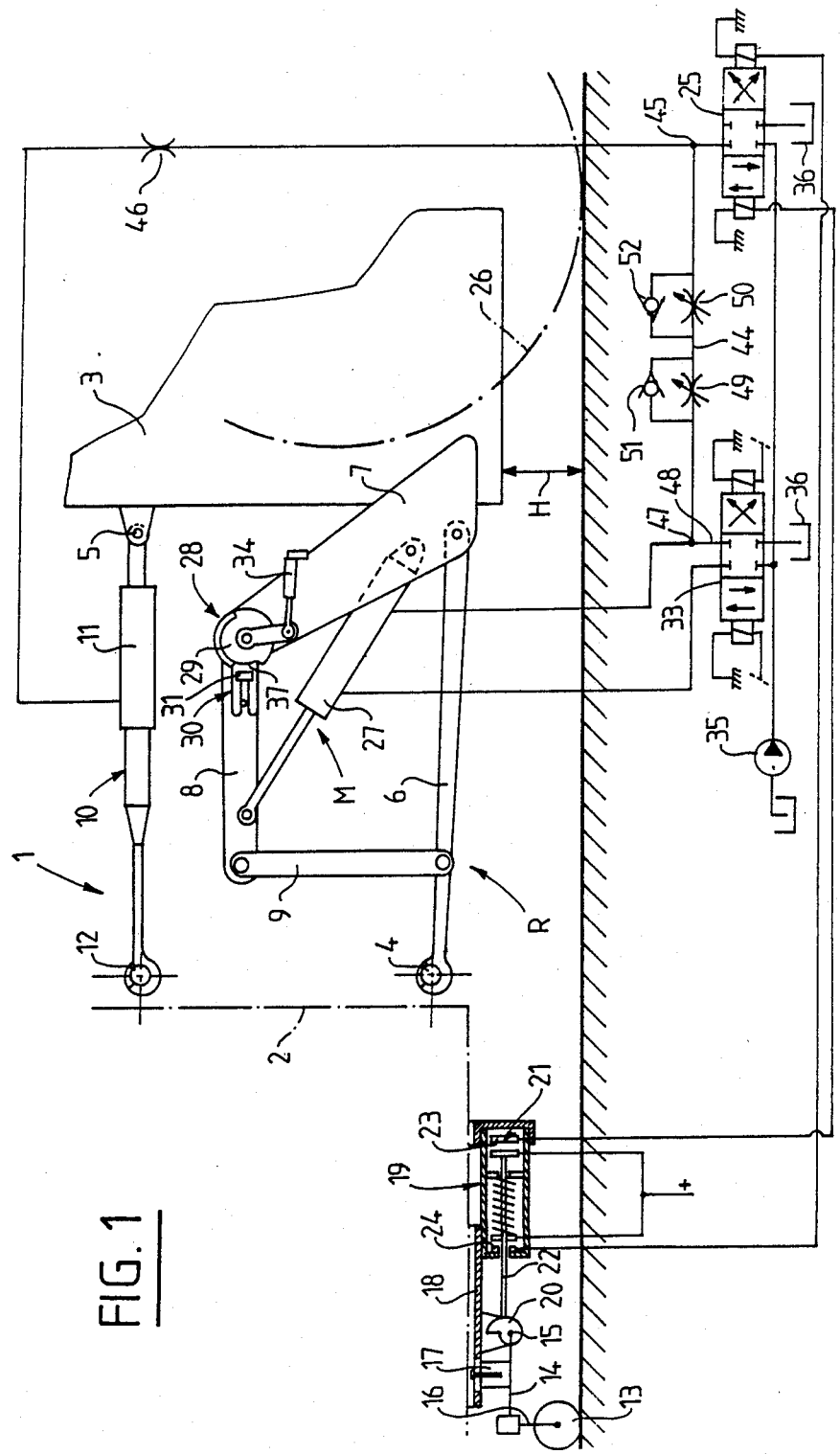
FIG. 1 is a schematic representation of a hitch gear in accordance with the invention for an agricultural implement designed to be carried at the front of a tractor.

Referring to FIG. 1, there is a hitch gear 1 for an agricultural implement 2, shown in diagram form, designed to be carried on a tractor 3. The hitch gear 1 comprises a lift system R with three points, i.e. two lower lateral points such as 4, and a high median point 5.

The hitch gear, shown in FIG. 1, is designed to be mounted at the front of a tractor to support an implement 2 which is pushed by the tractor 3. It is to be understood that the application to hitch devices at the rear of the tractor for an implement to be pulled.

Each lower point, such as 4, is comprised at its front end by a lower arm 6 articulated at its other end by a support 7 fixed on the tractor 3. An upper arm 8 is articulated at its rear end by the upper part of the support 7, so that the front end of said arm 8 is connected in an articulated manner with the lower arm by a rocker arm 9. Motor means M are provided for turning the arms 8 in the desired direction around its link on the support 7, which impels a corresponding movement of the lower arm 6.

The hitch gear 1 comprises a load transfer system 10 comprising a hydraulic cylinder 11, called cylinder at the third point, of variable length, disposed between the high median point 5 of the lift system of the tractor and a locking point 12 connected to the implement 2.

An adjustment wheel 13 is disposed ahead of the implement for taking up a portion of the load generated by the implement. If the implement is located at the rear of the tractor and pulled by it, the adjustment wheel is found behind the implement.

According to the schematic representation of FIG. 1, the adjustment wheel 13 is located at the front end of a longitudinal arm 14 which is articulated at its end around a transverse shaft 15. The wheel 13 is mounted on the lower end of a vertical rod 16 fixed in a vertically adjustable manner on the arm 14. Resilient means, in particular constituted by a block 17 of elastomeric material, are disposed between the arm 14 and an abutment 18 integral with the frame of the implement 2. The position of the block 17 is preferably adjustable in the longitudinal direction.

A load sensor 19 is combined with the adjustment wheel 13; this sensor comprises a cam 20 rotatingly connected with the arm 14 and an electrical switch 21 comprising a feeler 22 which elastically pushed against the cam 20.

The electrical switch 21 has two contacts 23, 24, one of which is set to close when the load supported by the wheel 13 exceeds a preset limit, while the other contact 24 closes when the load supported by the wheel 13 becomes less than the preset limit. The closure of these contacts is controlled by the movement of the rod of the feeler 22 in response to the turning of the cam 20 and arm 14 around the shaft 15 according to a greater or lesser compression of the block 17. Other systems for the detection of the relative movement of the wheel in relation to its support, such as inductive sensors, may be used.

The contacts 23 and 24 are respectively inserted in the electrical supply circuit of the control coils of a hydraulic valve 25 for the cylinder 11. This cylinder preferably is of the single action type and is adapted to shorten (return of the rod into the cylinder) when the fluid under pressure is admitted by the valve 25 into the work chamber of the cylinder 11. The closing of the contact 23 when the load supported by the wheel 13 increases, controls this decrease in the length of the cylinder 11 in order to bring about a reduction of the load supported by the wheel 13 and a transfer part of that load to the tractor 3.

When the contact 24 closes, the chamber of the cylinder 11 is connected to the reservoir by the valve 25 and the cylinder lengthens as a result of the load.

The load transfer system, briefly described above, essentially corresponds to that in FIG. 5 of French Patent 2 562 752, from which more detailed information can be obtained and the description of which should be considered to be incorporated by reference into the present invention.

When the load transferred to the tractor 3 varies, the ground clearance H of the tractor equally varies. Particularly, as a result of an increase of the transferred load, the clearance H diminishes, which corresponds to a lowering of the tractor 3 because of the compression of the suspension and its wheeling elements, in particular the tires 26. Inversely, but to a lesser degree, if H is increased as a result of a lessening of the transferred load, there is a reduction of the working depth, which results in a decreased quality of the work performed by the implement.

The means proposed by the invention, described hereinafter, make it possible to avoid that the change in the height over the ground is appreciably repeated in the height of the implement 2 and that it avoids a variation in the working depth.

The motor means M comprise a hydraulic cylinder 27 on each corner; these two cylinders are driven in parallel so that they simultaneously control the movement of the arm 8 which is associated with them in the same direction.

A control means 28 of the type described and claimed in French Patent 2 568 087 is provided for the control of the lift arms 8. The means 28 will be briefly described below. Reference should be made to French Patent 2 568 087 for a more ample description.

Figure 2:
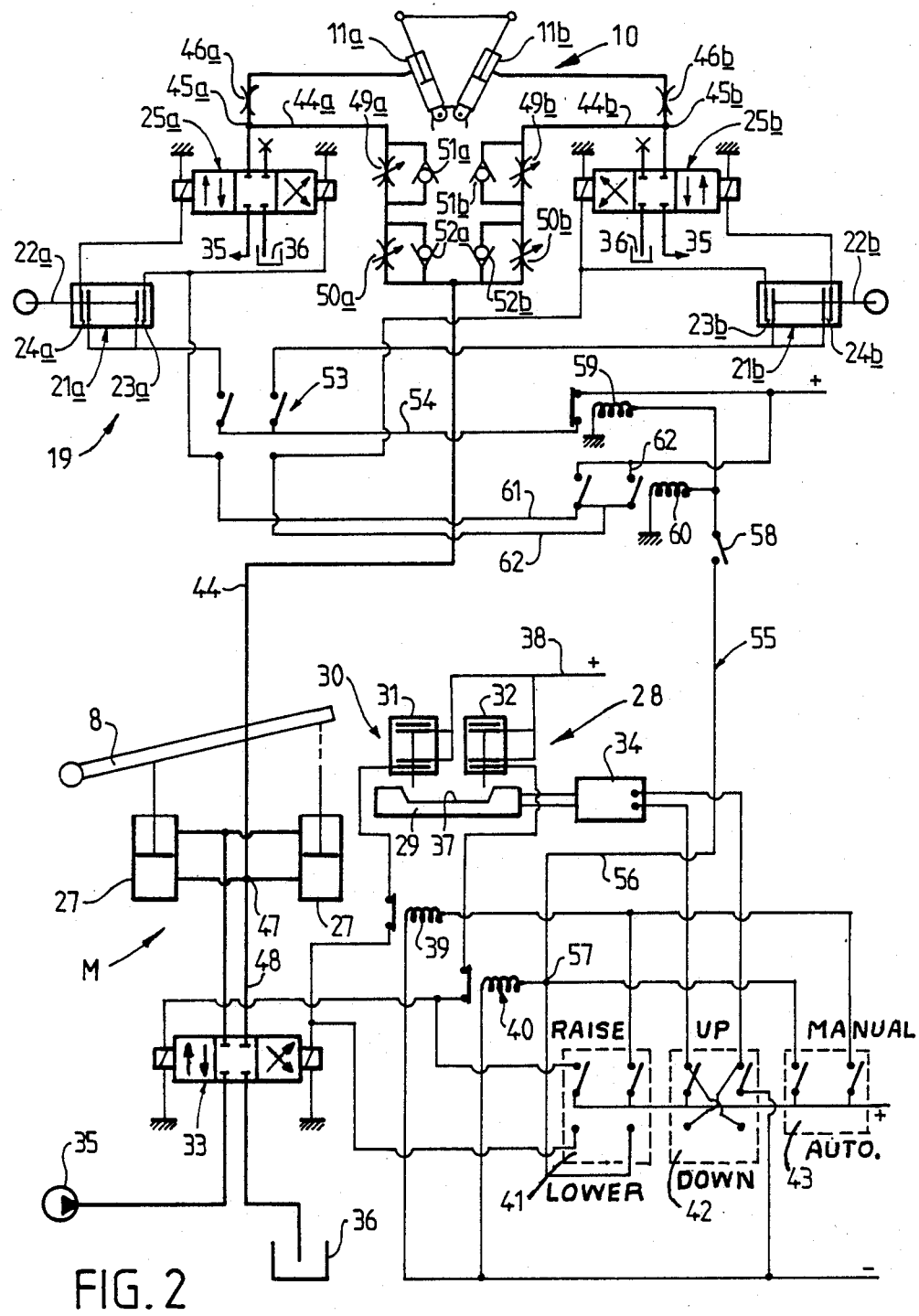
FIG. 2 is a hydraulic and electric diagram of the hitch gear.

The means 28 comprise at least one cam 29 (see FIGS. 1 and 2) for attaching one reference position of the lift arms 8, and control means 30 sensitive to the position of the cam; as shown in FIG. 2, the control means 30 comprise electrical micro-contacts 31, 32, which have a suitable pusher for being controlled by the cam 29. The contacts 31, 32 are respectively inserted in one of the electrical coil circuits of the control of an electro-hydraulic directional control valve 33 intended to supply power in parallel to double-action hydraulic lift cylinders 27. The directional control valve 33 may be of the closed center type.

Other means of determining the reference position may be used without departing from the scope of the invention.

The contacts 31, 32 are rotationally connected to the arms 8.

The cam 29 is disposed to be free to rotate around the shaft of the arm 8; the angled position of that cam is displaced by an electric indexing cylinder 34.

It should be remembered that the arrangement is disposed such that, when the cam 29 takes up a predetermined angled position, the control device reacts by connecting the cylinders 27 either to a source 35 of a liquid under pressure or to the reservoir 36 in such a way that the arms 8 and thus the contacts 31, 32 are displaced in the direction of the position indicated by the cam 29. When the pushers of the contacts 31, 32 arrive at a cut-out 37 of the cam 29 and are no longer stressed, the contacts 31 and 32 assume an open position; the control coils of the directional control valve 33 are no longer supplied with electric current and the directional control valve takes up a position of rest, because of which the chambers of the cylinders 27 are at the same time cut off from the pressure source 35 and from the reservoir 36.

Now the diagram of FIG. 2 in particular will be discussed, which relates to an embodiment according to which the load transfer system comprises two cylinders 11a, 11b, connecting the third locking point 5 of the tractor with an interface of the type described in French Patent 2 562 752.

An electrical supply line 38 is connected with the positive pole of a DC power source (not shown) and is connected in parallel to one of the poles of each of the contacts 31, 32.

A break contact of a relay 39, 40 is provided in the supply circuit of each control coil of the directional control valve 33.

A three-way directional control switch 41 is provided to allow manual operation of the raising and/or lowering of the arms 8.

In a first position of operation, shown by the word "LOWER", the directional control switch 41 controls the electrical supply of the coil of the directional control valve 33, which causes the movement of the latter into a position which assures the lowering of the arms 8; the directional control switch 41 is connected in a way to assure simultaneously the power supply of the relay 39 for opening the corresponding contact and to inhibit the power supply of the opposite winding of the directional control valve 33, which normally would be controlled by the cam 29 acting via the micro-contact 31 when the arm 8 is lowered beyond the position fixed by said cam.

In the other position of operation, represented by the word "RAISE", the directional control switch 41 controls the directional control valve 33 in the opposite sense such, that the raising of the arms 8 is caused and, at the same time, the power supply of the coil 40 for opening the corresponding contact and inhibits the supply of power to the opposite coil of the directional control valve 33 when the cam 29 acts on the micro-contact 32.

The directional control switch 41 is steady in the "RAISE" position and in the "LOWER" position automatically returns to the center position, because the forced lowering position is always temporary, while the "RAISE" position is used in a prolonged fashion at the end of the field during maneuvering. In the position of rest (center) of the directional control switch 41 none of the contacts connected to the circuit is supplied from a positive wire.

The control device comprises another three-way directional control switch 42, namely with two operational positions and one rest position. Each one of the operational positions corresponds to a turning command of the cam 29 in a certain direction. The operational position represented by the term "UP" corresponds to a turning of the cam 29 via the indexing cylinder 34 in a direction corresponding to a higher reference position of the arm 8. The operational position marked "DOWN" corresponds to a turning of the cam 29 in the opposite direction.

A third two-way manual/auto directional control switch 43 is provided. When this directional control switch 43 is placed in the "MANUAL" position, the two relays 39 and 40 are supplied with power in such a way that they open the corresponding contacts and inhibit any intervention of the micro-contacts 31, 32 in response to a turning of the cam 29.

In the "AUTO" position of this directional control switch 43, the relays 39 and 40 are not supplied with power and their resting contacts are closed, which allow automatic control of the position of the arms 8 by the contacts 31, 32, urged by the cam 29 in case of a variation between the reported and the reference positions.

A hydraulic connecting line system 44 is provided between the cylinder(s) at the third point 11 (FIG. 1) or 11a, 11b (FIG. 2) and the cylinder(s) 27 of the lift system. This line system 44 is connected in such a way that, when the cylinder at the third point 11, or 11a, 11b acts in a manner which causes an increase in the load supported by the tractor 3, said line system 44 permits the generation of a raising movement above the ground of the lift system and of the arms 8. In this way the lowering of the tractor after an increase of the load is compensated, regarding the level of the implement, by the raising of the part of the implement located next to the tractor.

In a case of a lessening of the load supported by the tractor, an inverse reaction is also produced as compensation.

In the exemplary embodiment shown, the cylinder at the third point 11 (FIG. 1) operates in a shortened mode for the transfer of a larger load to the tractor; to generate this shortening of the cylinder, the pressure liquid is admitted to the chamber traversed by the piston rod. The connecting line system 44 is connected to a point 45 (FIG. 1) of the conduit connecting the chamber of the cylinder at the third point with the outlet orifice of the associated directional control valve 25. The connecting point of the line system 44 is situated between the outlet of the directional control valve and a throttle device 46, i.e. upstream of that throttle.

At its other end, the line system 44 is connected to a point 47 of the conduit 48 provided between an outlet of the directional control valve 33 and a chamber of the cylinder 27. The said chamber is one receiving the pressure liquid for generating the raising of the arm 8. In the example shown the conduit 48 opens into the large-sized chamber of the cylinder 27, the one not traversed by the piston rod.

As seen in FIG. 1, the line system 44 is equipped with two adjustable throttles 49, 50 mounted in series. A non-return valve 51, 52 is connected between the inlet and the outlet of each throttle, the two valves 51, 52 being installed in the inverse direction.

Under certain conditions a simplified installation with a bi-directional, non-adjustable throttle might suffice.

When the liquid drains off through the line system 44 from the cylinder at the third point 11 towards the lift cylinder 27, throttling of the drainage is assured by the throttle 50 when the throttle 49 is short-circuited by the valve 51, which opens; for an opposite circulation of the liquid the throttle 49 intervenes, the valve 52 opens to short-circuit the throttle 50. Thus it is possible to control the effect of throttling in the direction of the circulation of the liquid in the line system 44 differently in relation to the internal pressure of the supply circuit and the pressure required by the implement.

The explanations given in respect to FIG. 1 are applicable to the diagram of FIG. 2 with the following changes.

Because, in accordance with FIG. 2, two cylinders at the third point 11a, 11b are provided, the line system 44 is divided, at its elongated end at point 47, into two branches 44a, 44b, respectively connected to the cylinders 11a, 11b. Adjustable throttle means are provided for each of the branches 44a, 44b and are provided with the same reference numerals as in FIG. 1 with the letter a or b added.

As shown in FIG. 2, the electrical circuit of the load transfer system comprises a switch 53 having two steady operating positions designated as "LOAD TRANSFER" and "RAISE" in the diagram. The movable bars of the switch 53 are connected by means of an electrical conductor 54 to the positive pole of a DC power source. When the bars are in the "LOAD TRANSFR" position, the switches 21a, 21b of the load sensors are connected to the positive pole and can control the directional control valve 25a, 25b in response to the movement of the feelers 22a, 22b.

When the bars of the switch 53 are in the "RAISE" position, the contacts 21a, 21b are no longer electrically supplied; on the other hand, the coil of the directional control valve 25a, 25b which controls the raising is powered such that the corresponding directional control valve admits pressure liquid into the chamber of the small section of the associated cylinder at the third point; said cylinder 11a, 11b shortens which causes the raising of the parts opposite the locking means of the implement 2.

An electrical circuit 55 is provided comprising an electrical conductor 56 connected at a point 57 to an electrical conductor connected to the positive pole of the DC power source when the switch 41 is placed in the "RAISE" position. Thus, when the switch 41 is placed in said "RAISE" position, the conductor 56 carries the voltage from the positive pole.

A switch 58 having steady open and closed positions is provided in the conductor 56. Downstream of this switch 56 the coils of two electromagnetic relays 59, 60 are provided, connected in parallel, between the extension of the conductor 56 and the ground.

The relay 59 comprises a resting contact inserted into the line 54.

Two operating contacts of the relay 60 are inserted in the parallel supply lines 61, 62, connected at one end to one of the contacts of the "RAISE" position of the switch 53, these lines 61, 62 being connected at their other ends, through the operating contact in association with the relay 60, with the conductor 56.

Accordingly, the operation of a hitch gear in accordance with the invention is as follows.

If during the operation of the implement the load transfer system 10 is activated because of a shortening of the cylinder at the third point 11, based on the inflow of pressure liquid into the chamber of the cylinder at the third point, a part of this pressure liquid is bled off through the connecting line system 44 and brought into the chamber of each cylinder 27. The increase in pressure causes a rising of the corresponding arms 8.

The raising of the implement produced by the lift system compensates for the lessening of the ground clearance H of the tractor because of the increase in the load it supports and the compression of the tires, and inversely, in case of a decrease in the load.

The throttle means 49 and 50 allow the taking into consideration of the varying exigencies of output and of pressure of the level of the cylinder at the third point 11 and the level of the lift cylinders 27.

In effect, there is no correlation between the the horizontal and vertical stresses supported by the implement 2; the cylinder(s) at the third point 11 mainly act(s) in response to horizontal stresses, while the cylinders 27 of the lift system mainly act against the vertical stresses developed by the implement.

Thus it could be thought that the establishment of a hydraulic connection 44 between the cylinder at the third point and the lift cylinders might produce disturbances in the hydraulic installation, with the appearance of vibrations and a drift in the level of the implement.

The solution provided by the invention, which interposes an independent reference position for the lift system, a reference position introduced in the described case by the cam(s), such as 29, together with the associated control means, and which preferably interposes the throttle means 49, 50 together with non-return valves, has the surprising result of an altogether satisfactory operation, free of vibrations and without drift in the position of the implement 2.

In case the load transfer system comprises two hydraulic cylinders 11a, 11b, such as in the diagram of FIG. 2, the effect of compensation on the level of the lift cylinders 27 is sensed when the cylinders at the third point 11a, 11b simultaneously undergo a variation of length in the same direction, i.e. when they are elongated or shortened simultaneously. This is true in the case which overall corresponds to a load transfer between the implement and the tractor, where compensation of the level of the lift cylinders is required.

On the other hand, if one of the cylinders at the third point, for instance 11a, extends while the other, for instance 11b, retracts, there would be little variation in the level of the lift system. In such a case, which appreciably corresponds to a swing of the implement around a longitudinal and horizontal axis, there is no noticeable variation in the height H of the tractor above the ground. Therefore no compensation is required.

The implement 2 practically does not "perceive" anymore the variations of the height H because of the transfer of the load, and this results in an improved operation of the implement. The surface of the soil being worked no longer presents variations in its level, leading to variations in the penetration of the implement into the ground, also including wavy ground.

The apparatus improves the quality of work in case of the application on wavy ground thanks to the improved following of the surface. In effect, when the ground bends upward, the implement must begin its lift while the tractor is still downwardly oriented. This is translated into a dig of the implement on the tractor side. The fact of a raising of the implement at the same time when there is a shortening of the cylinder clearly improves the quality of work.

To facilitate and speed up the raising of the implement, the operator closes the switch 58. Under these conditions, acting by means of the switch 41 by bringing it into the "RAISE" position, the operator causes the charging of the chambers in the large section of the cylinders 27 with pressure liquid which causes the raising of the arms 8 and, at the same time, the electrical line 56 is powered and the relays 59, 60 are charged.

The resting contact of the relay 59 opens, because of which the line 54 no longer is powered.

The operating contacts of the relay 60 close and assure the electrical charging of the appropriate control coils of the directional control valves 25a and 25b to cause the shortening of the cylinders 11a, 11b at the third point.

This results in a tilting upward movement of the implement 2 around a horizontal axis passing through the ends 4 of the arms 10. This upward tilting movement (in a clockwise direction according to the view of FIG. 1) is going to add to the correct elevation of the arms 8 and 6 to clear the implement above the ground.

This embodiment is particularly advantageous.

Particularly, at the time of the attachment of the implement the lowering of the wheel as a result of the load transfer causes an extension of the cylinder(s) at the third point which in this case are connected to the housing through the directional control valves 25a, 25b. Under these conditions a leakage of the feed fluids of the elevating cylinders 27 will occur with a resulting reduced attachment, a damping of the hydraulic circuit with loss of power. The blocking of the function "load transfer" and the activation of the cylinder(s) at the third point at the attachment removes this problem and improves the disengagement of the implement from contact with the ground.

The switch 58 allows the avoidance of a permanent electric connection. In this case and in the "MANUAL" position used for the coupling/uncoupling of the implement, it will be impossible to cause a pressure loss of the cylinder(s) at the third point, required to allow the effort-free pivoting of the implement.

What is claimed is:

1. A hitch for an agricultural implement of the type to be moved by a tractor, said hitch having a lifting system including three points, two being lower, lateral points and the third point being a median point located above said two lower points, a load transfer system including a first hydraulic cylinder means of variable length and operating between said third point and a locking point of the implement, first control means for controlling the operation of said first hydraulic cylinder means, at least one adjustment wheel means for attachement to the implement to support a part of the load generated by the implement, said wheel means including a load sensor connected to said first control means for actuation of said first control means in response to changes in the load detected by said load sensor so as to maintain a fairly constant load at the level of said wheel means and wherein the lifting system further comprises a second hydraulic cylinder means operating between the tractor and at least one of said lower, lateral points, second control means for controlling operation of said second hydraulic cylinder means and including position sensing means for actuation of said second control means upon deviation of the position of said at least one of said lower, lateral points from a reference position, hydraulic connecting means connecting said first hydraulic cylinder means and said second hydraulic cylinder means so that, when said first hydraulic cylinder means operates to impose an increase in the load supported by the tractor, said hydraulic connecting means will operate in response thereto to increase the level of the lifting system and when said first hydraulic cylinder means operates to reduce the load supported by the tractor, said hydraulic connecting means will operate in response thereto to lower the level of the lifting system.

2. A hitch according to claim 10, characterized in that the hydraulic distribution means is provided with adjustable throttle means.

3. A hitch according to claim 2, characterized in that the throttle means comprise two throttles (49, 50) installed in series and two non-return valves (51, 52) connected, respectively, between the inlet and outlet of each throttle, with the two valves being installed in an inverse direction.

4. A hitch in accordance with one of claims 1, 2 or 3 wherein the said first hydraulic cylinder means of said load transfer system comprises two hydraulic cylnders each having one end connected to said third point and an opposite end attached to separate locking points of the implement, the axes of said cylinders at said third point forming an angle and said hydraulic connecting means including two parallel conduits with each conduit being connected to a cylinder at said third point, said conduits being joined prior to said connection to said another hydraulic cylinder means of said lift system.

5. A hitch as claimed in claim 1 wherein said hydraulic connecting means includes a conduit joined to said first hydraulic cylinder means upstream of a throttle and another conduit supplying said second hydraulic cylinder means from said first control means, said first control means comprising a directional control valve.

6. A hitch as claimed in claim 1 wherein said hydraulic connecting means includes a conduit joined to said second hydraulic cylinder means and to both said first and second control means so as to admit fluid under pressure to said second hydraulic cylinder means to effect lifting of at least one of said lateral points.

7. A hitch as claimed in claim 1 wherein manual control means for effecting raising and lowering of the implement are provided and include an electrical circuit for controlling at least one of said control means, said circuit including a manual switch and means for shortening said first hydraulic cylinder means at said third point.

8. The hitch as claimed in claim 7 wherein said manual control means comprises a relay haing a coil with said coil connected with said electrical circuit, said first control means comprising a directional control valve including an actuation coil connected to said electrical circuit, said relay having contact means for controlling said actuation coil.

* * * * *

UNITED STATES PATENT AND TRADEMARK OFFICE
CERTIFICATE OF CORRECTION

PATENT NO. : 4,909,331

DATED : March 20, 1990

INVENTOR(S) : DEFRANCQ

It is certified that error appears in the above-identified patent and that said Letters Patent is hereby corrected as shown below:

On the title page, under item [19] and in item [76]:

Change inventor's name from "DEFRANCO" to -- DEFRANCQ --

Signed and Sealed this

Sixth Day of October, 1992

Attest:

DOUGLAS B. COMER

*Attesting Officer*     *Acting Commissioner of Patents and Trademarks*